United States Patent [19]

Shekleton

[11] Patent Number: 5,111,655
[45] Date of Patent: May 12, 1992

[54] SINGLE WALL COMBUSTOR ASSEMBLY

[75] Inventor: Jack R. Shekleton, San Diego, Calif.

[73] Assignee: Sundstrand Corporation, Rockford, Ill.

[21] Appl. No.: 455,245

[22] Filed: Dec. 22, 1989

[51] Int. Cl.⁵ .............................................. F02C 3/14
[52] U.S. Cl. ...................................... 60/39.36; 60/743
[58] Field of Search ................... 60/39.36, 734, 737, 60/740, 743, 755

[56] References Cited

U.S. PATENT DOCUMENTS

| | | | |
|---|---|---|---|
| 2,595,505 | 5/1952 | Bachle | 60/737 |
| 2,602,292 | 7/1952 | Buckland et al. | |
| 2,694,291 | 11/1954 | Rosengart | 60/39.36 |
| 2,709,893 | 6/1955 | Birmann | 60/39.36 |
| 3,020,718 | 2/1962 | Deacon et al. | |
| 3,269,119 | 8/1966 | Price | 60/39.36 |
| 3,309,866 | 3/1967 | Kydd | 60/39.36 |
| 3,310,940 | 3/1967 | Oetliker | 60/39.36 |
| 3,740,948 | 6/1973 | Kellett | |
| 3,866,413 | 2/1975 | Sturgess | |
| 3,912,164 | 10/1975 | Lefebvre et al. | |
| 4,084,371 | 4/1978 | Howald | 60/39.36 |
| 4,203,283 | 5/1980 | Weiler | 60/39.36 |
| 4,343,147 | 8/1982 | Shekleton | |
| 4,373,325 | 2/1983 | Shekleton | |
| 4,429,527 | 2/1984 | Teets | |
| 4,470,262 | 9/1984 | Shekleton | |
| 4,586,328 | 5/1986 | Howald | 60/737 |
| 4,967,562 | 11/1990 | Shekleton | 60/743 |

Primary Examiner—Louis J. Casaregola
Attorney, Agent, or Firm—Wood, Phillips, Mason, Recktenwald & VanSanten

[57] ABSTRACT

In order to reduce weight while also minimizing volume and pressure drop in a combustor assembly (18) for a turbine engine, the combustor assembly (18) includes an annular combustion chamber having a combustion space (20) defined entirely be an annular combustor case (22). The combustion chamber (18) is adapted to combust fuel and air in the combustion space (20) to generate gases of combustion. It has a combustor outlet (26) leading to a turbine nozzle (16). The outlet (26) is defined by a pair of turbine shrouds (28, 30). It also has a combustor inlet (32) leading to the combustion space (20). The combustor inlet (32) is defined by the combustor case (22) and one of the turbine shrouds (28). The combustion chamber (18) is adapted to receive injected air at the combustor inlet (32) in a manner creating a generally annular air flow in the combustion chamber (18) about the combustor case (22). In addition, the combustor assembly (18) is such that fuel in injected from a source into the combustion chamber (18) in the form of a fuel film (38) at the combustor inlet (32) radially inwardly of and directed parallel to the injected air which is preferably swirled to assist in atomizing the fuel film (38).

8 Claims, 1 Drawing Sheet

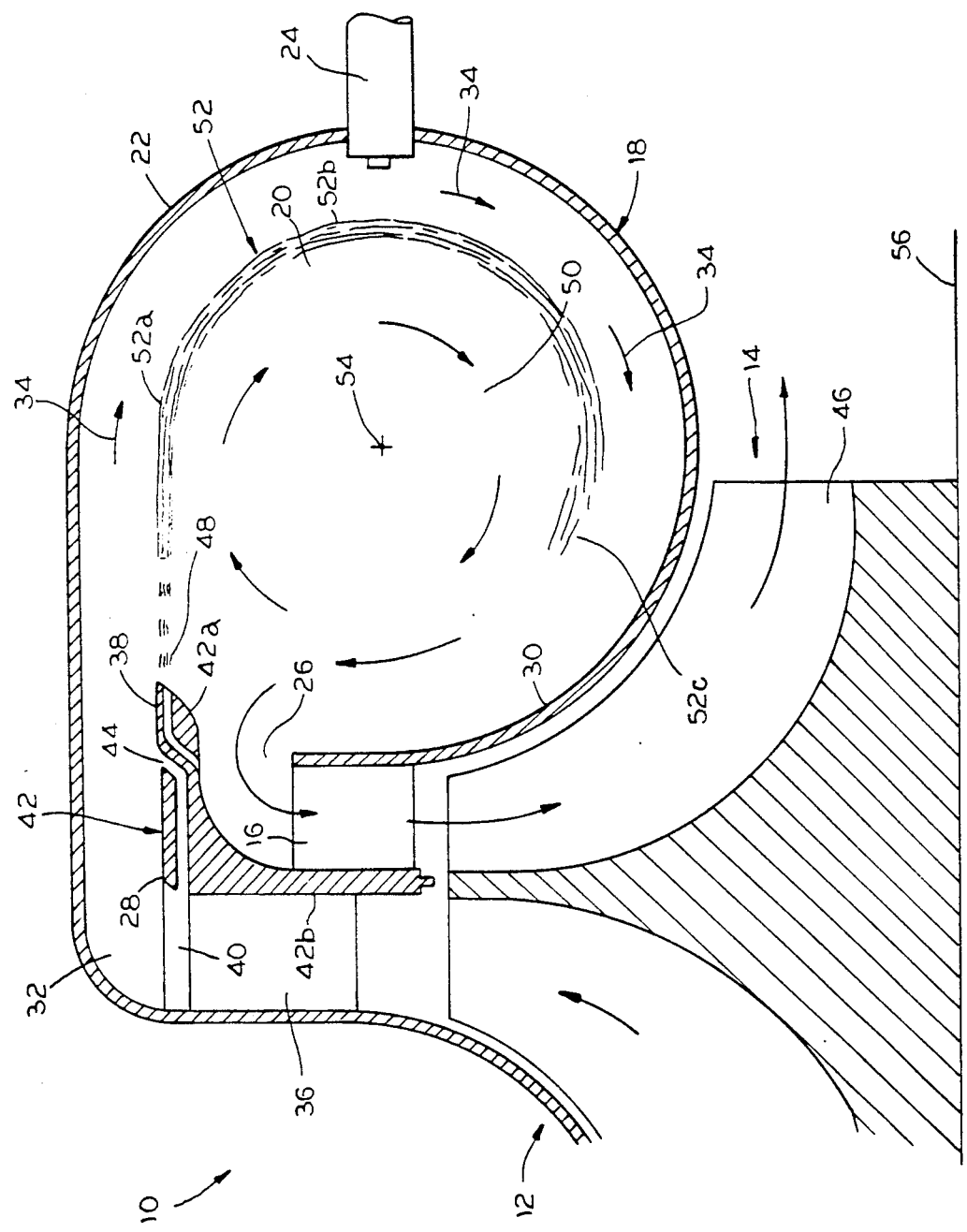

SINGLE WALL COMBUSTOR ASSEMBLY

FIELD OF THE INVENTION

The present invention is generally directed to a combustor assembly for a turbine engine and, more particularly, to a combustor assembly of reduced weight, volume and pressure drop.

BACKGROUND OF THE INVENTION

In conventional turbine engine combustor assemblies, the combustor is formed to have a wall defining a combustion space, and it is also typical of such assemblies to have a combustor case spaced outwardly of the wall so as to define an air flow passage therebetween. This air flow passage comprises the space between the combustor case and wall which is conventionally in communication with a compressor whereby compressed air is delivered to the air flow passage. With this construction, the compressed air is delivered to the combustion space through one or more openings in the wall defining the combustion space to provide air for combustion with fuel from an injector to drive the turbine engine.

While suitable for many applications, this type of arrangement has a number of disadvantages including the fact that the double-walled construction naturally adds weight to the overall assembly. This can be detrimental or at least undesirable for many, if not most, applications including those involving auxiliary power units and other power units typically associated with aircraft or other airborne vehicles. In addition to such problems as the foregoing, it is known to be a problem to avoid too great of volume and pressure drops in the design of conventional combustor assemblies.

As a result, design efforts in connection with turbine engine combustor assemblies are typically driven by a focus on avoiding such problems. These design efforts have almost always been directed to minor modifications of conventional combustor construction involving modification of relative size parameters, the positioning and location of dilution air inlets and fuel injectors, and variations in other parameters without departing from the basic conceptual combustor arrangement. However, it has remained to provide an entirely satisfactory turbine engine combustor assembly having all of the requisite characteristics.

In addition to such considerations, it has also remained to provide a turbine engine combustor assembly of significantly reduced expense.

The present invention is directed to overcoming one or more of the foregoing problems and achieving one or more of the resulting objectives.

SUMMARY OF THE INVENTION

It is a principal object of the present invention to provide a turbine engine combustor assembly having a reduced weight as well as minimized volume and pressure drop characteristics. It is a further object of the present invention to provide a turbine engine in which the combustor assembly has a an easy to manufacture, inexpensive, single-walled construction.

Accordingly, the present invention is directed to a combustor assembly having an annular combustion chamber including a combustion space defined entirely by an annular combustor case having no liner disposed therewithin. The combustion chamber is adapted to combust fuel and air in the combustion space to generate gases of combustion. It has a combustor outlet leading to a turbine nozzle. The outlet is defined by a pair of turbine shrouds. It also has a combustor inlet leading to the combustion space. The inlet is defined by the combustor case and one of the turbine shrouds. The combustor assembly further includes means for injecting air from a source into the combustion chamber at the combustor inlet in a manner creating a generally annular air flow in the combustion chamber about the combustion case. In addition, the combustor assembly includes means for injecting fuel from a source into the combustion chamber in the form of a fuel film at the combustor inlet radially inwardly of and directed parallel to the air injected by the air injecting means.

In a preferred embodiment, means are provided upstream of the combustor inlet for producing swirl air at a position upstream of the fuel injecting means for atomizing the fuel film. This may, for instance, comprise a plurality of diffuser vanes. Advantageously, the diffuser vanes are located upstream of the combustor inlet to circumferentially spread the fuel film on a surface of one of the turbine shrouds.

In an exemplary embodiment, the turbine shrouds include a front turbine shroud having a radially extending portion and an axially extending portion spaced inwardly of the combustor case to define the combustor inlet. The fuel injecting means then preferably includes a fuel passage leading from the source to the axially extending portion of the front turbine shroud for injecting fuel at low velocity into the combustor inlet. With this arrangement, the fuel passage preferably leads to a fuel orifice in a radially outwardly facing surface of the axially extending portion of the front turbine shroud for interaction with the swirl air to form and circumferentially spread the fuel film.

In a highly preferred embodiment, the turbine shrouds also include a rear turbine shroud which advantageously forms a generally annular extension of the combustor case. More specifically, the rear turbine shroud preferably extends to the combustor outlet between the combustion space and a plurality of turbine blades on a turbine wheel.

In another respect, the present invention is directed to a turbine engine having a rotary compressor and a turbine wheel coupled to the compressor for driven movement thereof. The turbine engine includes an annular nozzle proximate the turbine wheel for directing gases of combustion thereat and an annular combustor disposed about the turbine wheel and in fluid communication with both the compressor and the nozzle. With this construction, the combustor is defined by a single substantially continuous and generally annular combustor wall having at least one igniter mounted therein.

As before, the combustor is adapted to receive fuel from a source and air from the compressor to be combusted together in the annular combustion space to generate the gases of combustion.

Other objects, advantages and features of the present invention will become apparent from a consideration of the following specification taken in conjunction with the accompanying drawings.

BRIEF DESCRIPTION OF THE DRAWING

The drawing is a cross sectional view of a turbine engine combustor assembly in accordance with the present invention.

DETAILED DESCRIPTION OF THE PREFERRED EMBODIMENT

In the illustration given, the reference numeral 10 designates generally a turbine engine in accordance with the present invention. The turbine engine 10 includes a rotary compressor 12 and a turbine wheel 14 coupled to the compressor 12 for driven movement thereof. In addition, the turbine engine 10 includes an annular nozzle 16 proximate the turbine wheel 14 for directing gases of combustion thereat.

As shown, the turbine engine 10 also includes an annular combustor generally designated 18 which defines an annular combustion space 20 disposed about the turbine wheel 14 and in fluid communication with both the compressor 12 and the nozzle 16. The combustor 18 is defined by a single substantially continuous and generally annular combustor wall or combustor case 22 and has at least one igniter 24 mounted therein. With this arrangement, the combustor 18 is adapted to receive fuel from a source (not shown) and air from the compressor 12 for combusting the fuel/air mixture in the combustion space 20 to generate the gases of combustion.

In addition, the combustor 18 has a combustor outlet 26 defined by a pair of turbine shrouds 28 and 30 which leads to the turbine nozzle 16. The combustor 18 also has a combustor inlet 32 leading to the combustion space 20 which is defined by the combustor wall 22 and one of the turbine shrouds 28. With this arrangement, means are also provided for injecting air and fuel into the combustor 18 as will hereinafter be described.

More specifically, means are provided for injecting air from the compressor 12 into the combustor 18 at the combustor inlet 32. This is preferably done in such a manner as to create a generally annular air flow as shown by the arrows 34, i.e., the air flows in the combustor 18 generally about the annular combustor wall 22. In the illustrated embodiment, the air injecting means includes a plurality of compressor-diffuser vanes 36 upstream of the combustor inlet 32.

As also shown, means are provided for injecting fuel from the source into the combustor 18 in the form of a fuel film 38 at the combustor inlet 32 radially inwardly of and directly parallel to the air injected by the air injecting means. More specifically, the fuel injecting means advantageously includes a plurality of circumferentially spaced fuel passages such as 40 each of which leads from the source to an axially extending portion 42 of the front turbine shroud 28 for injecting fuel at low velocity into the combustor inlet 32. As will be appreciated, the fuel passages such as 40 each leads to one or more of a plurality of circumferentially spaced fuel orifices such as 44 in a radially outwardly facing surface 42a of the axially extending portion 42 of the front turbine shroud 28 for interaction with the injected air to form the fuel film 38.

In this connection, the turbine shrouds 28 and 30 include both a front turbine shroud 28 and a rear turbine shroud 30 as previously suggested hereinabove. The front turbine shroud 28 has not only the axially extending portion 42a spaced inwardly of the combustor wall 22 to define the combustor inlet 32 but also the radially extending portion 42b. The rear turbine shroud 30 forms a generally annular extension of the combustor wall 22 along a plurality of turbine blades 46 on the turbine wheel 14 to the nozzle 16.

As will now be appreciated, the present invention is directed to a unique combustor assembly comprising the annular combustor or combustion chamber 18 which includes the combustion space 20 that is defined entirely by the annular combustor wall or case 22. Swirl air is produced by suitable means upstream of the combustor inlet 32 such as the diffuser vanes 36 and upstream of the fuel injecting means or fuel orifices such as 44 for atomizing the fuel film 38 once it leaves the axially extending portion or annular lip 42a of the front turbine shroud 28, i.e., as at 48. In addition to atomization, the swirl air serves to circumferentially spread the fuel film 38 due to the combination of axial and tangential velocity components in the swirl air passing thereover.

From the foregoing, it will now be appreciated that fuel is brought through the compressor diffuser vanes 36 and injected at low velocity onto the radially outwardly facing surface 42a of the axially extending annular lip portion 42 of the front turbine shroud 28. The swirling compressor air entering the combustor inlet 32 causes the fuel film 38 to form and spread circumferentially on the surface 42a and, as the fuel film 38 leaves the axially extending annular lip portion 42, the fuel is turned into well atomized fuel droplets as at 48. Because of the geometry, the swirling air will be constrained to flow about the combustor case 22 as indicated by the arrows 34 until it eventually reaches the combustor outlet 26 and nozzle 16.

As shown in the drawing, a large scale recirculation zone 50 is formed within the annular combustor 18 to provide the needed ignition source for continuous operation. Of course, the igniter 24 is suitably located in the combustor case or wall 22 for the purpose of initial ignition or light-off. However, once the combustor 18 has achieved ignition, continuous operation follows by reason of the large scale recirculation zone 50.

As shown, there will be created a flame zone generally designated 52. Centrifugal force effects will tend to laminerize the flame zone 52 in regions 52a and 52b so that mixing between the annular air flow 34 and the large scale recirculation zone 50 is inhibited. Hence, in regions 52a and 52b the combustor case 22 is well cooled by the air from the compressor 12. In the region 52c, the centrifugal force effects will cause very fast mixing of fuel, flame and air to rapidly complete the combustion process.

In addition, this rapid mixing will promptly achieve the desired temperature for the gases of combustion prior to entry into the nozzle 16. This will serve to protect the turbine blades 46 on the turbine wheel 14. As a result, the annular combustor 18 is extremely well suited particularly for gas turbine missile applications.

As for the operation of the annular combustor 18, the axial velocity of the air $V_{ax}$ in rotation about the center of rotation 54 provides the advantageous centrifugal force effects. The tangential velocity $V_{tan}$, i.e., the velocity which causes the swirl of the entering air at the combustor inlet 32, has a center of rotation about the centerline 56 which causes a centrifugal force effect as with Vax in the region 52a, causes a neutral effect in region 52b and impedes mixing in region 52c. As will now be appreciated, it is possible by means of variations in the respective velocities, i.e., $V_{ax}$ (axial velocity) and $V_{tan}$ (swirl velocity) to achieve the desired rate of mixing.

In view of the foregoing, it should now be clear that the turbine engine combustor assembly of the present invention meets a formidable challenge. It provides not only an ultra-low cost assembly but also one which is extremely compact and lightweight. Even more important, it does so while providing high performance even with relatively difficult to burn fuels such as JP10.

While in the foregoing there has been set forth a preferred embodiment of the invention, it will be appreciated by those skilled in the art that the details herein given may be varied without departing from the true spirit and scope of the appended claims.

I claim:

1. A turbine engine, comprising:
   a rotary compressor;
   a turbine wheel coupled to said compressor for driven movement thereof;
   an annular nozzle proximate said turbine wheel for directing gases of combustion thereat;
   an annular combustor defining an annular combustion space disposed about said turbine wheel and in fluid communication with both said compressor and said nozzle, said combustor being defined by a single substantially continuous and generally annular combustor wall and having at least one igniter mounted therein, said combustor being adapted to receive fuel from a source and air from said compressor and to combust fuel and air in said combustion space to generate said gases of combustion;
   said combustor having a combustor outlet leading to said nozzle, said outlet being defined by a pair of turbine shrouds, said combustor also having a combustor inlet leading to said combustion space, said inlet being defined by said combustor wall and one of said turbine shrouds;
   means for injecting air from said compressor into said combustor at said combustor inlet in a manner creating a generally annular air flow in said combustor about said combustor wall; and
   means for injecting fuel from said source into said combustor at said combustor inlet radially inwardly of and directed parallel to said air injected by said air injecting means for atomization thereby;
   said turbine shrouds including a front turbine shroud having a radially extending portion and an axially extending portion spaced inwardly of said combustor wall to define said combustor inlet, said fuel injecting means including a fuel passage leading from said source to said axially extending portion of said front turbine shroud for injecting fuel at low velocity into said combustor inlet in the form of a fuel film, said fuel passage leading to a fuel orifice in a radially outwardly facing surface of said axially extending portion of said front turbine shroud for interaction with said injected air to form said fuel film.

2. The turbine engine of claim 1 wherein said turbine shrouds include a rear turbine shroud forming a generally annular extension of said combustor wall extending to said nozzle along a plurality of turbine blades on said turbine wheel.

3. The turbine engine of claim 1 wherein said air injecting means includes a plurality of compressor diffuser vanes upstream of said combustor inlet to produce swirling air at a position upstream of said fuel injecting means for atomizing said fuel.

4. A combustor assembly, comprising:
   an annular combustion chamber including a combustion space defined entirely by an annular combustor case;
   said combustion chamber being adapted to combust fuel and air in said combustion space to generate gases of combustion;
   said combustion chamber having a combustor outlet leading to a turbine nozzle, said outlet being defined by a pair of turbine shrouds, said combustion chamber also having a combustor inlet leading to said combustion space, said inlet being defined by said combustor case and one of said turbine shrouds;
   means for injecting air from a source into said combustion chamber at said combustor inlet in a manner creating a generally annular air flow in said combustion chamber about said combustor case;
   means for injecting fuel from a source into said combustion chamber at said combustor inlet radially inwardly of and directed parallel to said air injected by said air injecting means for atomization thereby; and
   means upstream of said combustor inlet for producing swirl air at a position upstream of said fuel injecting means for atomizing said fuel;
   said turbine shrouds including a front turbine shroud having a radially extending portion and an axially extending portion spaced inwardly of said combustor case to define said combustor inlet, said fuel injecting means including a fuel passage leading from said source to said axially extending portion of said front turbine shroud for injecting fuel at low velocity into said combustor inlet in the form of a fuel film, said fuel passage leading to a fuel orifice in a radially outwardly facing surface of said axially extending portion of said front turbine shroud for interaction with said swirl air producing means to form said fuel film.

5. The combustor assembly of claim 4 wherein said turbine shrouds include a rear turbine shroud forming a generally annular extension of said combustor case extending to said combustor outlet along a plurality of turbine blades on a turbine wheel.

6. The combustor assembly of claim 4 wherein said swirl air producing means includes a plurality of diffuser vanes upstream of said combustor inlet to circumferentially spread said fuel film on a surface of said axially extending portion of said front turbine shroud.

7. A turbine engine, comprising:
   a rotary compressor;
   a turbine wheel coupled to said compressor for driven movement thereof;
   an annular nozzle proximate said turbine wheel for directing gases of combustion thereat;
   an annular combustor defining an annular combustion space disposed about said turbine wheel and in fluid communication with both said compressor and said nozzle, said combustor being defined by a single substantially continuous and generally annular combustor wall and having at least one igniter mounted therein, said combustor being adapted to receive fuel from a source and air from said compressor and to combust fuel and air in said combustion space to generate said gases of combustion;
   said combustor having a combustor outlet leading to said nozzle, said outlet being defined by a pair of turbine shrouds, said combustor also having a combustor inlet leading to said combustion space, said inlet being defined by said combustor wall and one of said turbine shrouds;

said turbine shrouds including a front turbine shroud having a radially extending portion and an axially extending annular lip portion spaced inwardly of said combustor wall to define said combustor inlet, said turbine shrouds also including a rear turbine shroud forming a generally annular extension of said combustor wall extending to said nozzle along a plurality of turbine blades on said turbine wheel;

means for injecting air from said compressor into said combustor at said combustor inlet in a manner creating a generally annular air flow in said combustor about said combustor wall;

means for injecting fuel form said source into said combustor at said combustor inlet radially inwardly of said directed parallel to said air injected by said air injecting means for atomization thereby; and means upstream of said combustor inlet for producing swirl air at a position upstream of said fuel injecting means for circumferentially spreading and atomizing said fuel;

said fuel injecting means including a plurality of fuel passages leading from said source to said axially extending annular lip portion of said front turbine shroud for injecting fuel at low velocity into said combustor inlet in the form of a fuel film, each of said fuel passages leading to a fuel orifice in a radially outwardly facing surface of said axially extending portion of said front turbine shroud for interaction with said swirl air to circumferentially spread and atomize said fuel film.

8. The turbine engine of claim 7 wherein said swirl air producing means includes a plurality of diffuser vanes upstream of said combustor inlet.

* * * * *